Aug. 18, 1925.  
B. C. HVASS  
1,550,074  
TRAILER  
Filed Sept. 19, 1921 4 Sheets-Sheet 4

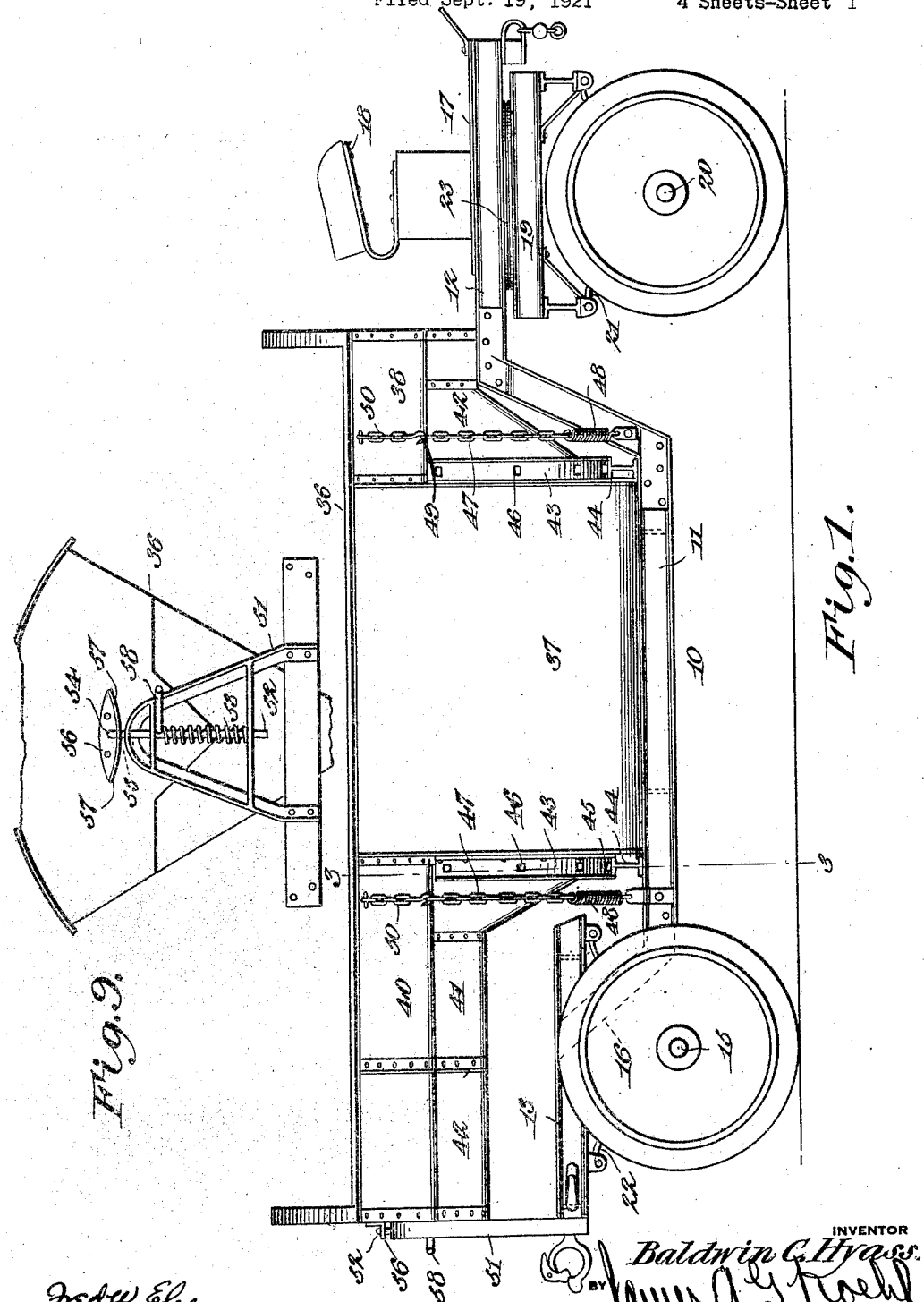

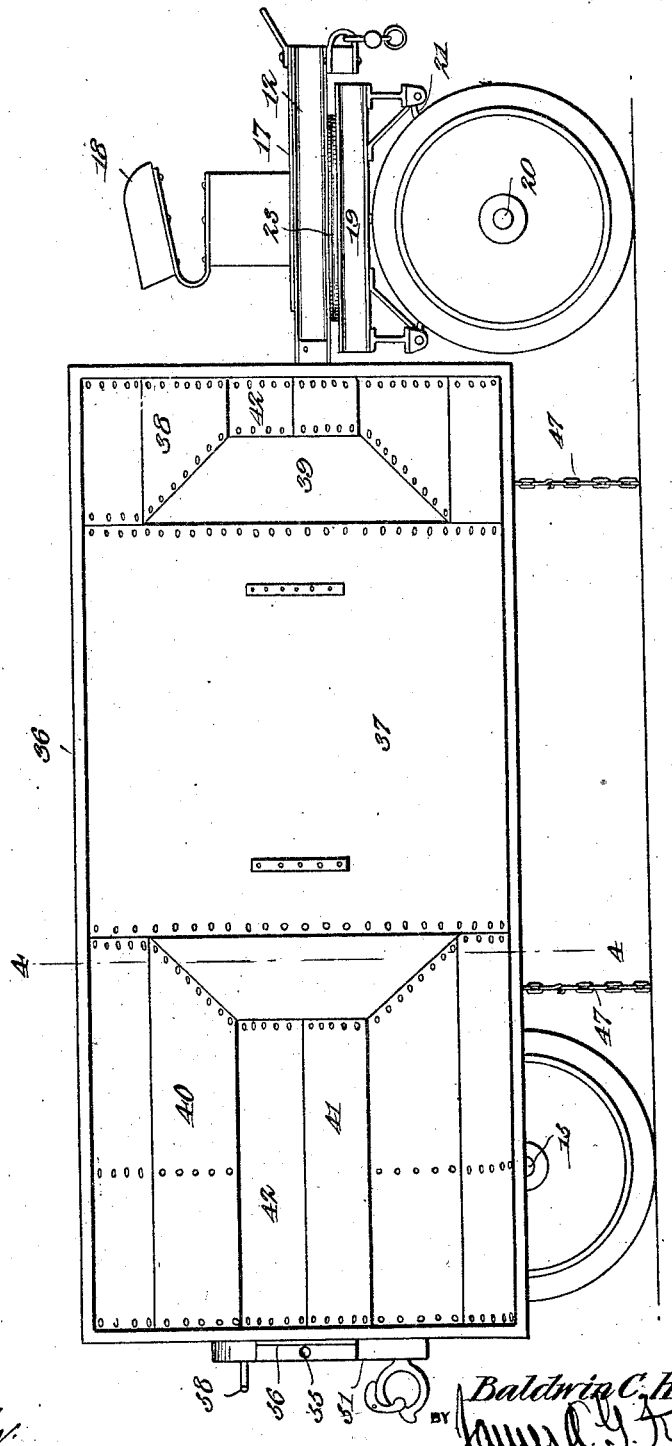

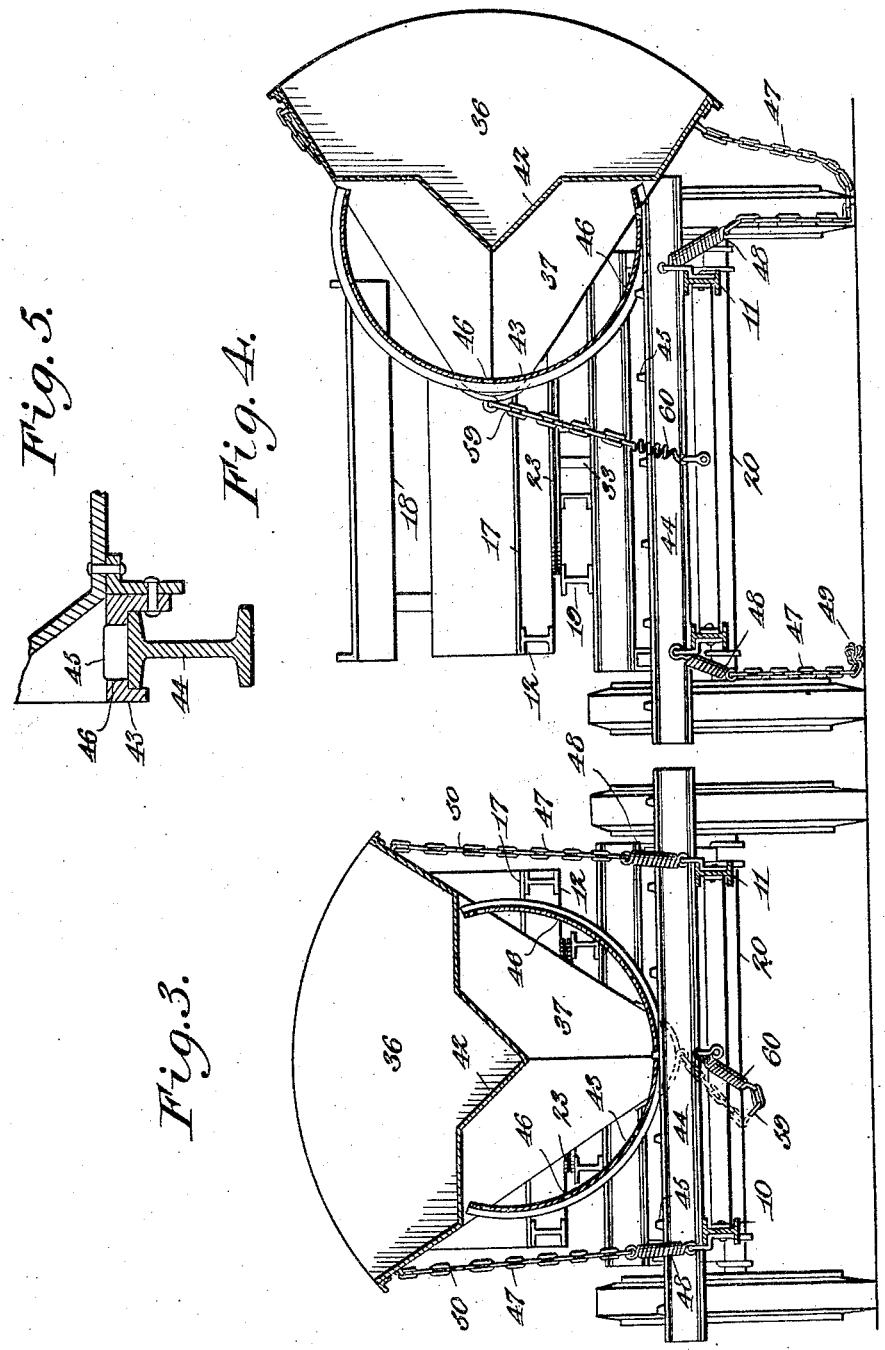

INVENTOR  
Baldwin C. Hvass  
BY  
ATTORNEY

WITNESS: Fred W. Ely

Patented Aug. 18, 1925.

1,550,074

UNITED STATES PATENT OFFICE.

BALDWIN C. HVASS, OF NEW YORK, N. Y.

TRAILER.

Application filed September 19, 1921. Serial No. 501,657.

*To all whom it may concern:*

Be it known that I, BALDWIN C. HVASS, a citizen of the United States, and resident of New York, in the county of New York and State of New York, have invented certain new and useful Improvements in Trailers, of which the following is a specification.

This invention relates to trailers and has for its primary object the provision of a structure of this character adapted to be used as a horse drawn vehicle in the collection of municipal refuse. It is customary to use wagons of this general type, first for the collection of refuse, and to then couple many of these wagons together in train formation and propel the train by means of a motor car or tractor, taking the collected refuse to a municipal dump or other depository. When a train is formed of many wagons or trailers of this well known type, it is very difficult to draw the train satisfactorily, there being a prominent tendency of the coupled trailers to sway to and fro when running at a speed of fifteen to twenty miles per hour. This is dangerous to vehicular traffic in congested thoroughfares and to the lives of pedestrians.

Bearing the above noted objections in mind, the broad objects of my invention are to provide a trailer which is well balanced; one having a low center of gravity; one capable of being hauled close to the curb; one that will satisfactorily turn sharp corners at the intersection of city streets without dumping the trailer over or placing any excessive strain on the frame of the trailer; one which will be light and simple of construction and adapted to be drawn by either draught animals or other power, and one having a maximum load carrying capacity.

Another object of the invention is to provide a trailer having a dumping body that can be adjusted to an angle of ninety degrees and the load dumped from either side of the body and the dumping operation performed by a single operator.

Another object of the invention is to provide the trailer with a novel form of fifth wheel and king-bolt which will prevent undue side sway of the structure when in transit and thereby relieve every part of the structure from serious strain when dumping a load, yielding means being incorporated in this fifth wheel and king-bolt arrangement so as to assist in accomplishing this function and result.

A still further object of the invention is to provide a trailer having a novel form of frame and a dumping body constructed and arranged so that sixty per cent of the supported load will be hung from the rear axle so as to permit a maximum load to be carried without over straining the fore part of the frame structure and the front axle and giving the requisite freedom to the kingbolt to warrant easy and quick turning.

Another object of the invention is to provide a trailer with a low center of gravity and for distributing the bulk of the load upon the rear axle, the purpose of which is to provide the dumping body with a low loading point from the street line or curb and at the same time causing the trailer to properly and safely hug the roadbed while in transit and to otherwise stabilize the structure.

Another object of the invention is to provide a trailer in which the body can be turned to dumping position and then brought back to a normal position with utmost convenience and on an application of very little manual effort.

A still further object of the invention is to provide a trailer having means for safeguarding against accidents in the ordinary use of the invention, and for automatically locking the body in its position of normal adjustment after its return from a dumping position.

A still further object of this invention is to provide a general combination of parts which will properly accomplish the foregoing features and advantages and at the same time, provide for ample platform space for the accomodation of more than one operator, the position of said platform being wholly within the space between the sides of the body whereby to protect the operator against being accidentally struck or brushed by a passing vehicle or other objects.

The various important features will be particularly pointed out hereinafter in connection with a detailed description of a preferred embodiment of my invention which I have selected for illustration in the accompanying drawings, in which similar reference characters indicate corresponding parts in the several views.

In the drawings:

Figure 1 is a view in side elevation of my invention.

Figure 2 is a similar view showing the body in a tilted position where it is disposed wholly at one side of the frame of the invention.

Figure 3 is a vertical section taken on the line 3—3 of Figure 1.

Figure 4 is a similar view showing the body in its tilted position.

Figure 5 is a section through the supporting rail showing the correlated body surface associated therewith.

Figure 9 is an end view of the body showing the locking mechanism for holding the same in a position of normal adjustment.

Figure 6:
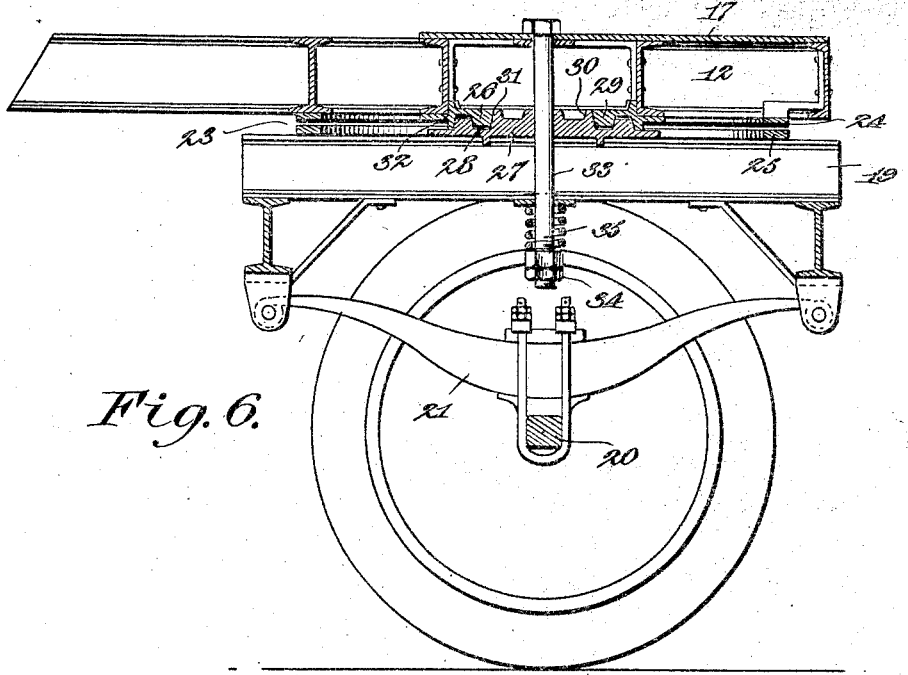
Figure 6 is a section through the fifth wheel.
Figure 7:
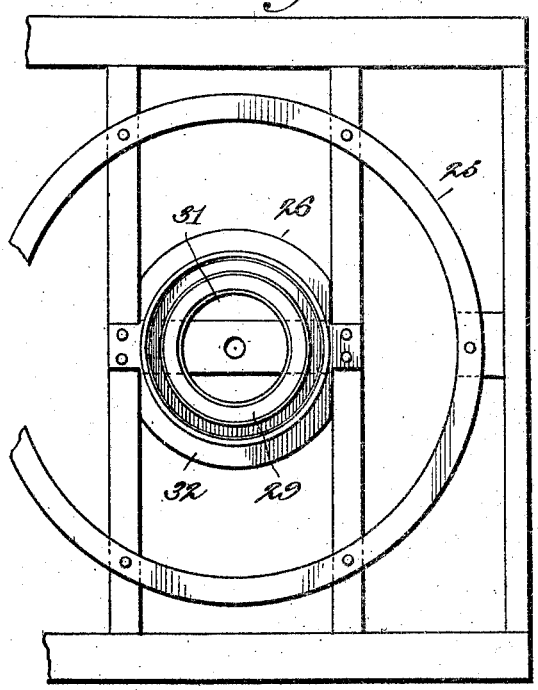
Figure 7 is a plan view of the underside of a portion of the frame showing the male section of the fifth wheel.
Figure 8:
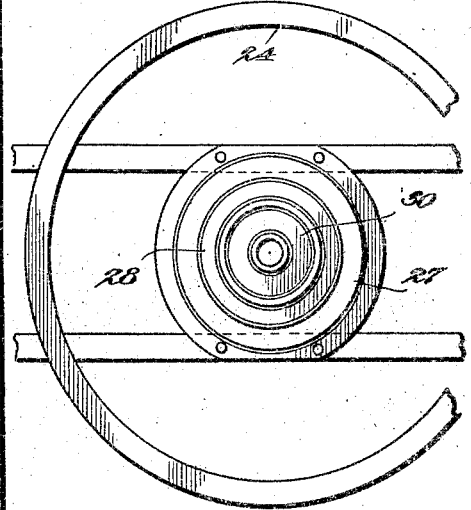
Figure 8 is a plan view of the female section of the fifth wheel.

Except as regards certain features of novelty and combination of parts necessary herein to provide a combined trailer and dump wagon which will function as described in the foregoing, I do not wish it to be understood that I have limited my invention by referring to same as a trailer of the dump wagon variety. There are many characteristics of the invention which, within certain of the appended claims justify my reference to a slightly broader use of the invention. For example, I may desire to mount the body of the structure permanently upon its supporting frame so that the whole may be used as an ordinary wagon, and it should be borne in mind that my means for distributing the bulk or major part of the load to the rear axle, well fits the invention for this deviation. Wherever I mention trailer or dump-wagon, it therefore remains that I do so simply to properly show and describe the best purpose for which the invention is intended, and that changes in forms, proportions, materials and arrangements can be made within the scope of the following claims.

In carrying the invention into practice, I employ a frame 10 of substantially U-shaped form, made up of I beams and arranged to provide an intermediate saddle 11 and forwardly and rearwardly extending sections 12 and 13 respectively. In plan view, this frame is rectangular and made up of identical sides connected together at suitable points by I beams. The saddle extends for a considerable distance below the sections 12 and 13 so as to give the structure a low center of gravity and for the purpose of placing the top of the load carrying body within easy reach of the operator when loading the trailer from the curb or street. Another reason for this arrangement is to permit the load carrying body to be swung clear to either side of the frame as will be understood when reference is made to the description of this body.

The rear section 13 is supported in any suitable well known manner upon a wheeled axle 15 and the sides of the saddle 11 are connected with the sides of this section 13 by means of diagonal beams or bars 16, the upper ends of the latter disposed directly above or in vertical alinement with said rear axle 15.

The front section 12 supports a platform 17 on which the operator's seat 18 is mounted. This platform is disposed wholly within the sides of the frame so as to protect the driver against accidentally coming in brushing contact with passing vehicles or other objects.

The front section 12 directly overlies the bolster frame 19 which carries the front wheeled axle 20. Semi-elliptic springs 21 are interposed between the axle 20 and the bolster frame, and these springs serve with those shown at 22 between the rear axle and the frame section 13 to give ample buoyancy to the entire structure. Interposed between the bolster frame 19 and the section 12 is a fifth-wheel 23, the same comprising large diameter steel rings 24 and 25 secured respectively to the parts 12 and 19, and male and female disks 26 and 27, secured respectively to said parts 12 and 19. The female disk 27 is provided with an annular channel 28 disposed in concentric relation to the rings 23 and 24, and this channel receives a corresponding boss 29 on the disk 26. A large central boss 30 on the disk 27 freely extends into a receiving opening 31 in the aforesaid disk 26. On the outside of the disk 26 is a circular skirt 32 which embraces the outside walls of the disk 27. The king-pin 33 passes downward through the platform 17, then through the center of the disk 27 and then finally through the bolster frame 19. The free end of this bolt is provided with clamping nuts 34 and between same and the underside of the frame 19 is a strong coiled spring 35. It will be seen that this form of fifth wheel furnishes a multiplicity of concentric bearing surfaces against which all side thrusts and stress are imparted, and in consequence thereof, the rear part of the vehicle is held against serious swaying to and fro when the vehicle is in motion. The construction, when associated with the form of king bolt also allows for limited vertical separation of the frame 10 with respect to the bolster frame so that all shocks, jars and strains are removed from the structure during the act of dumping the body of the vehicle as well as at the time of sudden jolting of the vehicle when in motion. This is an essential part of my invention when taken in combination with the features of a side tilting body as heretofore, considerable damage has resulted through lack of adequate means for absorbing these shocks.

Mounted upon the frame 10 is a side tilting body 36 provided with an intermediate deep pocket 37, a forwardly extending section 38 having a pocket 39, and a rearwardly extending section 40 having a pocket 41. The interior walls of these sections 38 and 40 are provided with angular surfaces 42 which give material strength to the body and which further provides means for causing the contents of the body to be quickly discharged during the dumping operation. These sections are also of different relative lengths, and the distance between the center of the pocket 37 and the rear end of the frame section 13, disposes the major portion of the body toward the rear axle. This, when taken in connection with the arrangement of the connecting bars 16, subjects said rear axle to the greater part of the supported load. The body closely follows the longitudinal shape of the frame 10 and when turned on its axis, the body is entirely disposed at an angle of ninety degrees to the plane of said frame. The base walls of the pocket 37 are curved transversely and secured thereto, are substantially semi-circular channel bars 43—43 adapted to roll or rock on transverse I-beams 44—44 having rack teeth 45 adapted to successively engage in co-acting openings 46 in said bars 43—43. The body can thereby be swung to either side of the frame 10, and it will be further observed that by the teeth meshing with the openings 46, the body is properly stabilized and held against accidental derangement.

A set of chains are provided for limiting the tilting movements of the body 36, each set comprising two or more chains 47. I provide one set of these chains at each side of the body, and as shown, these chains are supported from elastic devices or springs 48 carried by the frame 10 and they are provided with free ends 49 adapted for detachable connection at 50 with the dumping body. According to the direction in which the body is to be tilted, one set of said chains are retained in engagement with the body, and the other chains of the companion set detached therefrom.

It will be observed that the two forward chains 47 are arranged in advance of the deep pocketed portion 37 of the body, and connect the forward shallow pocketed portion 38 of the body with an underlying portion of the frame, while the two rear chains 47 are arranged in rear of the deep pocketed portion 37 of the body, and connect the rear shallow pocketed portion 40 of the body with an underlying portion of the frame. The two front and rear sets of chains 47 are, therefore, arranged on opposite sides, that is, in front and rear, of the deepest portion of the body which is mounted to tilt laterally on the saddle, and also respectively in front and in rear of the front and rear trackways on which the body tilts. As a result of this arrangement of the springs 47, having the cushioning springs 48, such chains act to yieldingly hold the body down upon the frame and to resist the cushion upward movements of the front and rear ends of the body due to the passage of the front and rear wheels over railway tracks, uneven ground surfaces and other obstructions, whereby undue rattling and excessive jolts, shocks and strains upon the body and frame are prevented, said arrangement of the springs being of material importance in this connection in mutually resisting vertical play of the ends of the body through its tendency to rock or tilt on a transverse axis.

The mechanism for normally holding the dumping body in a relatively fixed or loading or carrying position, comprises a bracket 51 which rises from the rear of the frame 10, and mounted to slide in this bracket is a locking pin 52, normally held elevated by the action of a spring 53 and carrying a free active end 54 adapted to engage in the opening 55 of a keeper plate 56. This plate 56 is secured to the rear head of the dumping body, and said plate is curved transversely whereby its surfaces 57—57 will be directly brought against the said end 54 to depress the pin during the act of returning the body to its normal position. This mechanism is automatic when the body is returning to its original position, but when it is desired to free the body so that it can turn in either direction, the pin is manually depressed and disengaged from its keeper plate, a handle 58 on the stem or pin being provided for this purpose.

In using a trailer of this character, one operator generally stands in the body 36 after the body has been partly loaded, and it will be observed that the chains hold the body against tilting to a position where the pin 52 would be seriously strained and perhaps broken. In order to limit swinging movement of the body when dumping its contents, I provide chains 59 between the base of the intermediate portion of the tilting body and the cradle or saddle of the frame 10. These chains are provided with suitable shock absorbing springs 60 to cushion the shocks when the body is suddenly thrust sidewise or to tilted position.

What I claim as my invention is:

1. A combined trailer and dump wagon comprising a substantially U-shaped frame having relatively off-set respectively forwardly and rearwardly extending sections and an intermediate saddle, front and rear axles operatively connected with said sections, the saddle suspended from the said front and rear sections and the point of suspension at the rear of the saddle being directly over the rear axle in vertical alignment therewith, and a body mounted in the saddle and arranged with the major part of its length extending from the center of the saddle to a point over the rear section.

2. A combined trailer and dump wagon comprising a substantially U-shaped frame having relatively offset respectively forwardly and rearwardly extending sections and an intermediate saddle, front and rear axles operatively connected with said sections, the saddle being suspended from said front and rear sections and the point of suspension at the rear of the saddle being directly over the rear axle in vertical alinement therewith, and a body having a deep pocketed portion mounted in the saddle and relatively shallower front and rear pocketed portions extending respectively over the offset front and rear frame sections, said rear pocketed portion being of materially greater length than said front pocketed portion and said body being arranged with the major part of its length extending from the center of the saddle to a point over the rear frame section.

3. A combined trailer and dump wagon comprising a substantially U-shaped frame having relatively offset respectively forwardly and rearwardly extending sections and an intermediate section, front and rear axles operatively connected with said sections, a body having a deep pocketed portion mounted to tilt laterally on the saddle and relatively shallower front and rear pocketed portions extending respectively over said front and rear frame sections, the saddle being suspended from said front and rear frame sections and the point of suspension at the rear of the saddle being beneath the rear shallow pocketed portion of the body and directly over the rear axle in vertical alinement therewith, front and rear sets of limitation chains arranged at each side of the body respectively in front and rear of its deep pocketed portion and detachably connecting the front and rear pocketed portions with underlying portions of the frame, and auxiliary limitation chains arranged on opposite sides of the transverse center of and disposed between and connecting the base of said deep pocketed portion of the body of the saddle, the said front and rear limitation chains and auxiliary limitation chains being each provided with a cushioning spring in the length thereof.

Signed at New York, in the county of New York, and State of New York, this 12th day of Sept. A. D. 1921.

BALDWIN C. HVASS.